W. O. OWEN.
PRODUCTION OF INSETS ON MOVING PICTURE FILMS.
APPLICATION FILED NOV. 11, 1920.

1,397,602.

Patented Nov. 22, 1921.
2 SHEETS—SHEET 1.

Wm. O. Owen
INVENTOR.

BY

ATTORNEY.

W. O. OWEN.
PRODUCTION OF INSETS ON MOVING PICTURE FILMS.
APPLICATION FILED NOV. 11, 1920.

1,397,602.

Patented Nov. 22, 1921.
2 SHEETS—SHEET 2.

Wm. O. Owen INVENTOR.

BY

ATTORNEY.

UNITED STATES PATENT OFFICE.

WILLIAM O. OWEN, OF WASHINGTON, DISTRICT OF COLUMBIA.

PRODUCTION OF INSETS ON MOVING-PICTURE FILMS.

1,397,602.   Specification of Letters Patent.   Patented Nov. 22, 1921.

Application filed November 11, 1920. Serial No. 423,417.

*To all whom it may concern:*

Be it known that I, WILLIAM O. OWEN, a citizen of the United States of America, residing at Washington, District of Columbia, have invented certain new and useful Improvements in the Production of Insets on Moving-Picture Films, of which the following is a specification.

The art of producing insets in moving picture films has already been developed somewhat and according to the usual procedure followed, the insets are produced in the camera in taking the original negative. In this operation a sheet of opaque material, for example a sheet of metal, is cut in such a way that a part only of each frame of the moving picture film negative, in passing through the camera, is exposed, for example, to a scene forming a part of the main picture story, after which operation the film negative in the camera is wound back, a complementary sheet of metal of a size and shape capable of covering the exposed portion of each of the frames is substituted and the camera is then directed either at a stationary object or a motion scene and the camera is again run, to place the negative of the inset in that portion of each of the frames of the film negative, which was not exposed during the first operation. The negative is then developed, fixed and dried in the ordinary manner. This mode of operation is open to certain objections, among which may be mentioned the fact that an expensive operator is required for operating the camera.

In accordance with the present invention, I aim to produce a similar effect in the printing operation, and for this purpose, the original negative is taken as if no inset were to be produced.

This original negative is then developed in any approved manner.

Figure 1:
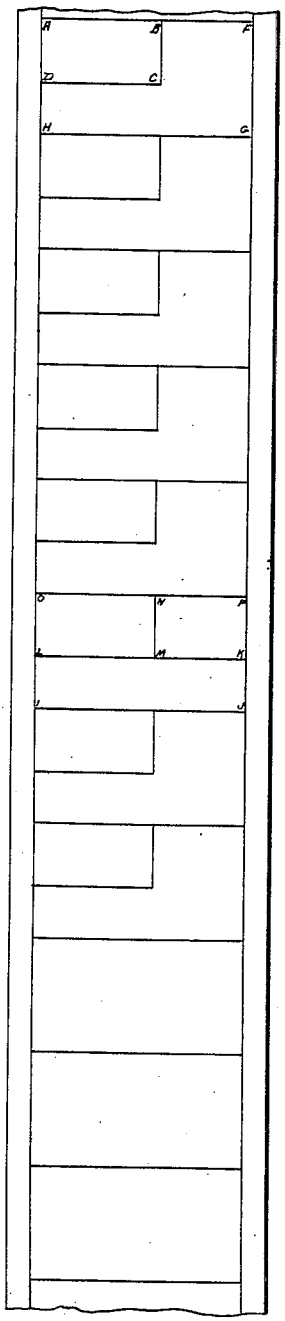

Figure 1 of the accompanying drawing shows diagrammatically a strip of film, the upper portion of said figure representing a section of film in which the inset is made and the lower portion of said figure representing another section of the film in which no inset is made.

Figure 2:
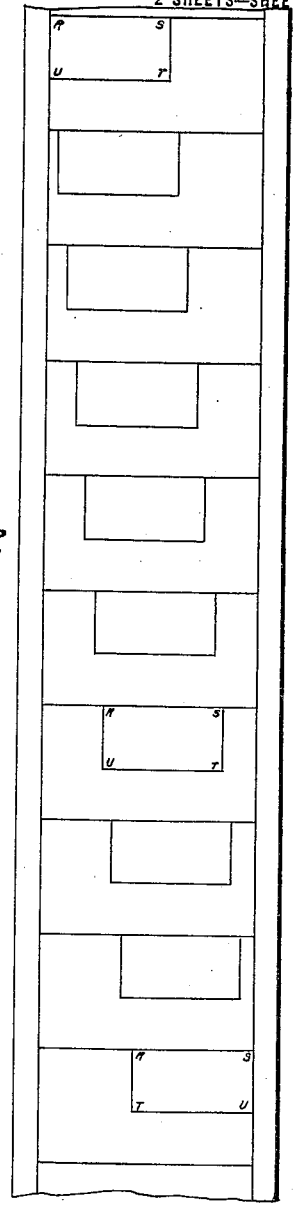
Figure 3:
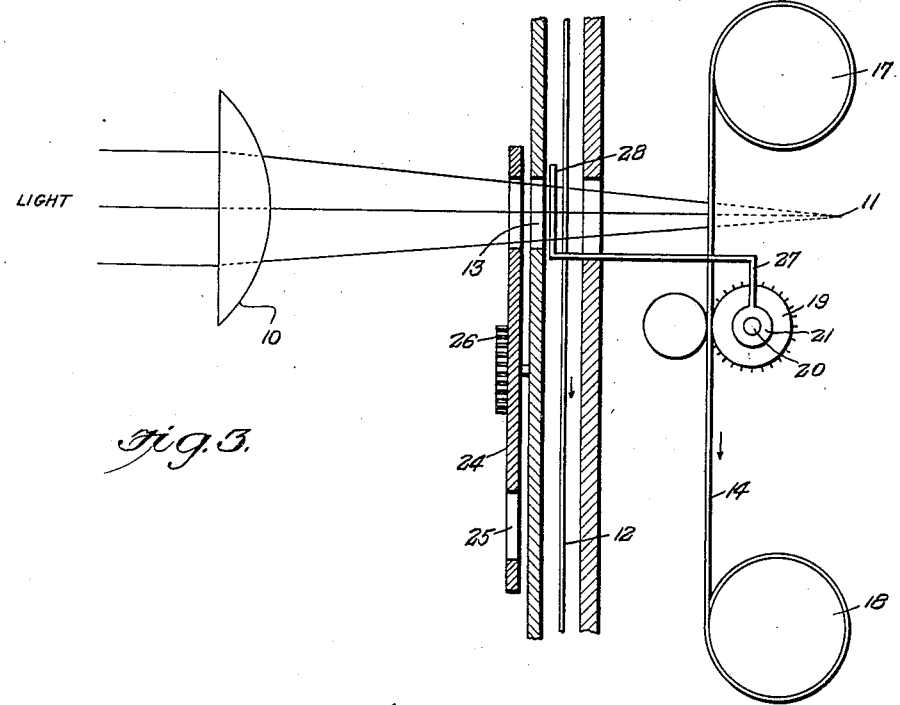
Figure 4:
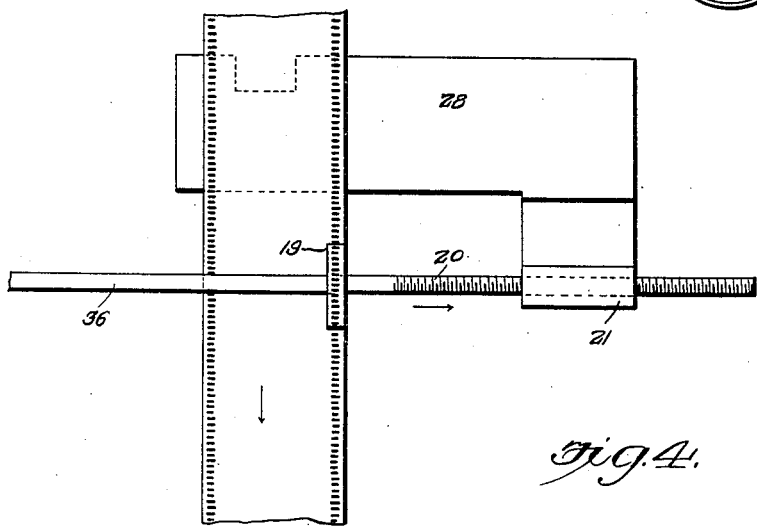

Fig. 2 shows a film which has an inset which moves in the field (*e. g.* across the top of the screen) when the picture is projected upon the screen. Fig. 3 is a diagrammatic view in vertical section of a suitable form of apparatus which may be employed in the first printing operation, in making the film shown in Fig. 2. With a different cut-out substituted, the same apparatus could if desired be used in the second printing operation of making the said film. Fig. 4 represents a vertical section looking from the right in Fig. 3, the double front wall of the printing machine being omitted, as well as the film 14, and the spools 17 and 18, for the sake of clarity of illustration.

In the operation of my process, a moving picture film, such as an original negative, after having been exposed as if no inset effect were to be produced, developed and ready for use in the printing operation, and also a film which is to constitute the finished film, say a positive film, are then run in the usual manner through a suitable printing machine, but one portion of each of the frames of the said film positive is covered up, for example, by a suitably shaped piece of opaque material, such as sheet metal capable of covering a portion of each frame, *e. g.*, the small rectangle marked A—B—C—D in Fig. 1 of the accompanying drawing. Such piece of metal may be referred to as a "cut-out". This piece of metal may be secured to a part of the frame work of the printing machine in any suitable manner, for example, it may be clamped in the aperture or window of the printing machine. The portion of the length of film which is to have an inset having been passed through the printing machine, and a part of each frame printed, the film is, without developing, run back to the starting point of the inset which, of course, should be suitably marked, and which point constitutes the point in the length of the film where the piece of metal covering the rectangle A—B—C—D was first inserted.) This piece of metal is then taken out, and another piece of metal capable of covering that portion of the frame left uncovered in the first printing operation, for example, the figure B—F—G—H—D—C is substituted, which allows the rectangle of each frame A—B—C—D to be exposed in passing through the printing machine. A suitable series of images for constituting the inset are then printed in this series of rectangles A—B—C—D, forming the inset. These images may represent either stationary or moving scenes, persons, ideas or legends, or any other matter which would be suitable as insets.

It may be frequently desired to print the insets from an ordinary moving picture film, into the small rectangles above referred to, for example successive frames of a moving picture negative being used for printing in the rectangles of successive frames of the film being made, and for this operation, it may be advisable to reduce the picture from standard size frames down to the size of the rectangle A—B—C—D which operation can readily be effected by properly distancing and focusing from the film negative onto these rectangles. It is understood that any other film structure, e. g., a stationary negative, could be likewise employed in such second-mentioned printing operation. Fig. 3 shows diagrammatically such a printing operation.

The film, after the two printing operations, is then ready for developing and drying in the usual manner.

In some cases it might be advisable or desirable to produce two or more insets upon the frames of a given portion of the length of the film. Thus, for example a series of scenes constituting a portion of a picture story could be printed upon the portions I—J—K—L, a first inset could be produced in the rectangle L—M—N—O and a second inset could be produced in the same manner on the rectangle K—M—N—P.

The printing in the main portion of each of the frames may include if desired, standard intensity printing or it may include a fade in, a fade out or a dissolve, in that portion of the length of film carrying the inset. Likewise in some cases, the series of images constituting the inset may, by suitably adjusting the light in the inset printing operation, be made to fade in or fade out, or to dissolve, or if desired these insets may be of standard or any other desired intensity, depending upon what results are desired. After (or before) the portion of the length of the film carrying the inset has been printed, the succeeding portion of the film upon which no inset is to be made (as illustrated in the three lower frames of Fig. 1) is printed and the entire film is developed in the usual or any desired manner.

In the above description I have repeatedly referred to printing positive images from photographic negatives. It is to be understood that negatives can be printed from positives in the analogous manner.

In the above example, the location of the inset would be stationary on the frame. If desired, the cut-out plates could be arranged to gradually slide across the aperture of the printing machine, the inset being thereby caused to travel across the film. This can easily be effected for example by a screw mechanism working in conjunction with the sprocket wheel feeding the film through the printing machine.

In Fig. 2, the inset S—T—R—U is shown as being successively displaced in the successive frames. This displacement is exaggerated in the drawing. It may be, as shown in the top frame of Fig. 2, at the upper left-hand corner at one end of the portion of the film carrying the inset; and at a greater or smaller number of frames away from this point, at the other end of the portion of the film carrying the inset, it may be at the upper right-hand corner of the frame as shown in the bottom of Fig. 2.

Fig. 4 shows a simple device in which the perforations in the edge of the film mesh with a sprocket wheel carried upon a shaft, one end of which is screw threaded, such portion passes through a non-rotating, laterally movable, internally threaded block 21, whereby the rotation of the sprocket wheel 19, which causes the movement of the film lengthwise (i. e. vertically in the drawing) causes also a very gradual movement of the block 21, sidewise, whereby the cut-out plate moves gradually across the film, the rate of movement depending on the pitch of the screw.

It is of course, to be understood that the two printing operations (the printing of the main part of the frames, and the printing of the inset part thereof) can be carried out in either order desired.

I have above referred to printing insets much smaller than the ordinary sized film. These can be printed for example, as shown diagrammatically in Fig. 3. In this figure, the lens 10 causes the rays of light to converge to a point 11. Hence in passing through the developed film (say a negative) 12, as the same passes intermittently past the window 13 (or stated otherwise, the image diminishes in size) by the time the light reaches the film 14 being printed upon. The films 12 and 14 each are moved together, intermittently, as by suitable sprocket wells, and the window may be closed by a suitable rotating shutter 24, having openings 25, and rotated at predetermined speed by gear 26, during such movement. The said film 14 can be unwound from one reel 17, and wound up upon another reel 18, during the operation, while similar reels will be provided for the film 12. The film 14 may be moved by a sprocket wheel 19, the teeth of such wheel passing through the perforations in the edge of the film. As shown in Fig. 4, the said wheel 19 is mounted on a power shaft 36, a portion of which is screw threaded, which portion passes through a slidable non-rotating block 21 (internally screw threaded), which causes the block to move either to the right or left, thereby carrying the film with it. This block carries metal strip 27, the part 28 of which forms the cut-out. It is understood that this is merely one conventional manner of causing the inset to move upon the successive frames of the picture strip.

I claim:

1. A process of printing moving picture films having inset portions, which comprises covering up a corresponding portion of each of a series of frames of the section of an undeveloped sensitized film strip being printed upon, by an appropriately shaped opaque cut-out, located between the source of light and the strip being printed upon, while such strip is being intermittently moved past said cut-out, and while said film strip is being passed through a printing operation, thereby printing images upon the exposed portions of each of such frames, such film being of a size adapted for use in a moving picture projection apparatus; and without developing such partly printed film, intermittently moving such partly printed film into successive positions, in which the portions of the successive frames printed upon in such first printing operation are covered up by an appropriately shaped cut-out located between the film being printed upon and the source of light, while printing from some other film structure, a series of photographic images upon the portions of the frames not printed upon in such first-mentioned printing operation; at least one of such printing operations involving from a succession of frames of a portion of a developed moving picture film; and thereafter developing the said twice-printed film.

2. A process of producing a moving picture inset on a moving picture film, which comprises covering a corresponding portion of each one of a series of frames of a film while passing through a printing operation, printing from a series of frames of a moving picture film a series of images on the non-covered portions of such frames, such images being of a reduced size relative to the film from which they are being printed; and without developing such partly printed film, covering such printed sections of such frames and printing from a moving picture film upon the non-covered portions of such frames, and thereafter developing the film.

3. In the process of claim 1, the improvement which comprises gradually moving the opaque cut-out used in the first mentioned printing step, and correspondingly moving the opaque cut-out used in the second mentioned printing operations.

4. A moving picture film, the successive frames of a given section thereof carrying images corresponding to a portion of a moving picture story, such images covering a portion only of the several frames, and insets covering other portions of the several frames of such section, the said insets being successively displaced relatively to each other, whereby upon projecting the film upon a screen, the inset is caused to move on the screen.

In testimony whereof I affix my signature.

WILLIAM O. OWEN.